United States Patent
Xiang et al.

(10) Patent No.: US 11,356,613 B2
(45) Date of Patent: Jun. 7, 2022

(54) ELECTRONIC DEVICE WITH ROTATABLE CAMERA, CONTROL METHOD, AND CONTROL APPARATUS

(71) Applicants: CHENGDU BOE OPTOELECTRONICS TECHNOLOGY CO., LTD., Sichuan (CN); BOE TECHNOLOGY GROUP CO., LTD., Beijing (CN)

(72) Inventors: Jie Xiang, Beijing (CN); Jing Wang, Beijing (CN); Zhiyong Yang, Beijing (CN); Ming Li, Beijing (CN); Na Zhang, Beijing (CN); Wei Li, Beijing (CN); Kaimin Wang, Beijing (CN); Shuzhen Yang, Beijing (CN)

(73) Assignees: CHENGDU BOE OPTOELECTRONICS TECHNOLOGY CO., LTD., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/956,323

(22) PCT Filed: Jan. 16, 2020

(86) PCT No.: PCT/CN2020/072402
§ 371 (c)(1),
(2) Date: Jun. 19, 2020

(87) PCT Pub. No.: WO2020/156196
PCT Pub. Date: Aug. 6, 2020

(65) Prior Publication Data
US 2021/0099651 A1    Apr. 1, 2021

(30) Foreign Application Priority Data
Feb. 1, 2019   (CN) .......................... 201910106373.X (51) Int. Cl.
*H04N 5/225*    (2006.01)
*H04N 5/232*    (2006.01)
*H04M 1/02*    (2006.01)

(52) U.S. Cl.
CPC ...... *H04N 5/23299* (2018.08); *H04M 1/0264* (2013.01); *H04N 5/2253* (2013.01); *H04N 5/232939* (2018.08)

(58) Field of Classification Search
CPC .. H04N 5/2253; H04N 5/2257; H04N 5/2258; H04M 1/0264
(Continued)

(56) References Cited

U.S. PATENT DOCUMENTS

| 8,112,128 B2 * | 2/2012 | Lee ...................... H04M 1/0264 455/575.1 |
| 2005/0168628 A1 * | 8/2005 | Wang .................. H04M 1/0214 348/375 |

(Continued)

FOREIGN PATENT DOCUMENTS

| CN | 103024106 A | 4/2013 |
| CN | 204216938 U | 3/2015 |

(Continued)

OTHER PUBLICATIONS

Chinese Office Action, with English translation cited in counterpart application No. 201910106373.X, dated Mar. 3, 2020, 19 pages.
(Continued)

*Primary Examiner* — Anthony J Daniels
(74) *Attorney, Agent, or Firm* — Muncy, Geissler, Olds & Lowe, P.C.

(57) ABSTRACT

An electronic device with a rotatable camera, a control method, and a control apparatus are provided. The electronic device with the rotatable camera includes a camera assembly, a drive assembly, a rotating assembly, a controller, and
(Continued)

a housing, where the housing is a polyhedron, one face of the polyhedron is provided with a groove, the groove extends to an edge of the face, the controller is electrically connected to the drive assembly, and is configured to control the drive assembly to drive the rotating assembly to rotate, and the camera assembly is provided in the groove, is attached to the rotating assembly, and is rotatable around the edge.

20 Claims, 7 Drawing Sheets

(58) Field of Classification Search
USPC .......................................................... 348/376
See application file for complete search history.

(56) References Cited

U.S. PATENT DOCUMENTS

| | | | |
|---|---|---|---|
| 2015/0005031 A1 | 1/2015 | Sheu | |
| 2020/0296191 A1* | 9/2020 | Zeng | .................... H04N 5/2254 |
| 2020/0366774 A1* | 11/2020 | Jia | ............................ G06F 1/16 |

FOREIGN PATENT DOCUMENTS

| | | | |
|---|---|---|---|
| CN | 104580904 A | 4/2015 | |
| CN | 205142339 U | 4/2016 | |
| CN | 106790826 A | 5/2017 | |
| CN | 206413083 U | 8/2017 | |
| CN | 207638717 U | 7/2018 | |
| CN | 207706231 U | 8/2018 | |
| CN | 207706235 U | 8/2018 | |
| CN | 108712539 A | 10/2018 | |
| CN | 208079214 U | 11/2018 | |
| CN | 109547606 A | 3/2019 | |
| CN | 109981950 A | 7/2019 | |
| EP | 1460836 A2 | 9/2004 | |
| WO | WO 2019059895 A1 | 3/2019 | |
| WO | WO-2019184475 A1 * | 10/2019 | ........... H04N 5/2259 |

OTHER PUBLICATIONS

International Search Report and written opinion, with English translation, cited in counterpart PCT application No. PCT/CN2020/072402, dated Mar. 23, 2020, 17 pages.

* cited by examiner

ELECTRONIC DEVICE WITH ROTATABLE CAMERA, CONTROL METHOD, AND CONTROL APPARATUS

CROSS-REFERENCE TO RELATED APPLICATIONS

The present application is a U.S. national phase application of a PCT Application No. PCT/CN2020/072402 filed on Jan. 16, 2020, which claims a priority to Chinese Patent Application No. 201910106373.X filed in China on Feb. 1, 2019, the disclosures of which are incorporated in their entirety by reference herein.

TECHNICAL FIELD

The present application generally relates to extensive fields (for example, the field of computer technology), in particular to an electronic device with a rotatable camera, a control method, and a control apparatus.

BACKGROUND

Full-screen mobile phones already become a trend. In implementing a full-screen display, where a front-facing camera unit should be placed remains a tricky problem, yet the front-facing camera unit is indispensable. There are few solutions to the problem of placing the front-facing camera unit in the related art. A new solution is required to resolve this problem. In addition, in a conventional mobile phone, the resolution of a front-facing camera is usually lower than that of a rear-facing camera. The imaging quality of the front-facing camera is still lacking compared with the imaging quality of the rear-facing camera.

SUMMARY

According to a first aspect, an electronic device with a rotatable camera is provided, the electronic device including a camera assembly, a drive assembly, a rotating assembly, a controller, and a housing, where the housing is a polyhedron, one face of the polyhedron is provided with a groove, the groove extends to an edge of the face, the controller is electrically connected to the drive assembly, the controller controls the drive assembly to drive the rotating assembly to rotate, and the camera assembly is provided in the groove, is attached to the rotating assembly, and is rotatable around the edge.

In one or more embodiments of the present application, under control of the controller, a target angle is formed between the camera assembly and the bottom of the groove, and the target angle is any angle between 0° and 180°.

In one or more embodiments of the present application, the electronic device includes a working face and a rear face opposite to the working face, where the groove is located in the rear face, and the camera assembly is configured to act as a working-face camera assembly of the electronic device after the camera assembly is rotated by 180 degrees.

In one or more embodiments of the present application, the drive assembly is a stepper motor.

In one or more embodiments of the present application, the rotating assembly is a rotating rod or a gear shaft, and the rotating rod or the gear shaft is parallel to the edge;

the camera assembly includes an attaching portion, and the attaching portion is used to attach the camera assembly to the housing; and one end of the rotating assembly is inserted in the attaching portion, and the other end is attached to a main shaft of the stepper motor.

In one or more embodiments of the present application, the camera assembly includes at least one camera lens and at least one flashlight.

In one or more embodiments of the present application, the camera assembly includes three camera lenses and one flashlight, the camera lenses and the flashlight are sequentially arranged in a direction perpendicular to the rotating rod or the gear shaft, and the flashlight is located on a side proximate to the rotating rod or the gear shaft.

In one or more embodiments of the present application, the electronic device includes a mobile phone, a PAD, and a display.

According to a second aspect, a control method applied to the electronic device provided in the embodiments of the present application is provided, the method including:

acquiring a status of a camera assembly, and displaying a start-rotation instruction interface or a stop-rotation instruction interface according to the status; and starting or stopping a rotation of the camera assembly according to a received instruction.

In one or more embodiments of the present application, the displaying the start-rotation instruction interface or the stop-rotation instruction interface according to the status includes:

displaying the start-rotation instruction interface when the status is a stopped state; and displaying the stop-rotation instruction interface when the status is a rotating state, where the status includes the stopped state and the rotating state.

In one or more embodiments of the present application, the displaying the start-rotation instruction interface when the status is the stopped state includes:

when the stopped state is a rear-facing stopped state, displaying a start-rotation instruction for rotating to become a front-facing camera;

when the stopped state is a front-facing stopped state, displaying a start-rotation instruction for rotating to become a rear-facing camera; and when the stopped state is an intermediate stopped state, displaying a start-rotation instruction including a rotate-to-front sub-instruction and a rotate-to-rear sub-instruction, where the stopped state includes the rear-facing stopped state, the intermediate stopped state, and the front-facing stopped state, the rear-facing stopped state is a stopped state in which an angle between the camera assembly and the bottom of a groove is 0°, the front-facing stopped state is a stopped state in which the angle between the camera assembly and the bottom of the groove is 180°, and the intermediate stopped state is a stopped state in which the angle between the camera assembly and the bottom of the groove is more than 0° and less than 180°.

In one or more embodiments of the present application, the starting or stopping the rotation of the camera assembly according to the received instruction includes:

controlling the camera assembly to rotate in a direction away from the bottom of the groove when the instruction is the start-rotation instruction for rotating to become the front-facing camera or the rotate-to-front sub-instruction;

controlling the camera assembly to rotate in a direction toward the bottom of the groove when the instruction is the start-rotation instruction for rotating to become the rear-facing camera or the rotate-to-rear sub-instruction; and stopping the rotation of the camera assembly when the instruction is a stop-rotation instruction.

According to a third aspect, a control apparatus applied to the electronic device provided in the embodiments of the present application is provided, the apparatus including:

an interface display circuit, configured to acquire the status of a camera assembly, and display a start-rotation instruction interface or a stop-rotation instruction interface according to the status; and an operation circuit, configured to start or stop the rotation of the camera assembly according to a received instruction.

BRIEF DESCRIPTION OF THE DRAWINGS

Other features, objectives, and advantages of the present application will become more obvious by reading detailed description of non-limitative embodiments with reference to the following accompanying drawings.

DETAILED DESCRIPTION

The present application is further described below in detail with reference to the accompanying drawings and the embodiments. It may be understood that the specific embodiments described herein are only for illustrative purposes and are not intended to be limitative. In addition, it further needs to be noted that only parts related to the present disclosure are shown in the accompanying drawings for ease of description.

It needs to be noted that the embodiments in the present application and the features in the embodiments may be combined with each other if no conflict is incurred. The present application is described below in detail with reference to the accompanying drawings and in conjunction with the embodiments.

In the description of the present invention, it needs to be understood that orientation or location relationships indicated by terms "center", "longitudinal", "transverse", "up", "down", "front", "rear", "left", "right", "vertical", "horizontal", "top", "bottom", "inside", "outside" are based on orientation or location relationships shown in the accompanying drawings, and are only used to facilitate description of the present disclosure and simplify description, and are not used to indicate or imply that the apparatuses or elements must have specific orientations or are constructed and operated by using specific orientations, and therefore, cannot be understood as being limitative.

Figure 1:
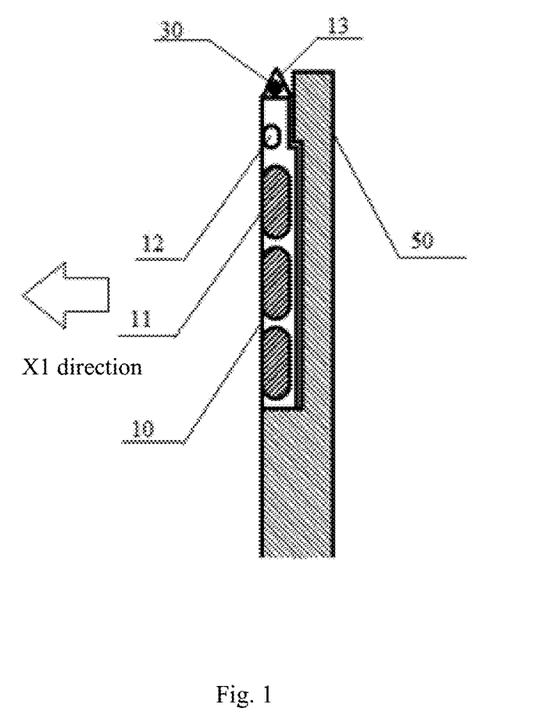
FIG. 1 is an exemplary structural block diagram of an electronic device with a rotatable camera according to an embodiment of the present application.
Figure 2:
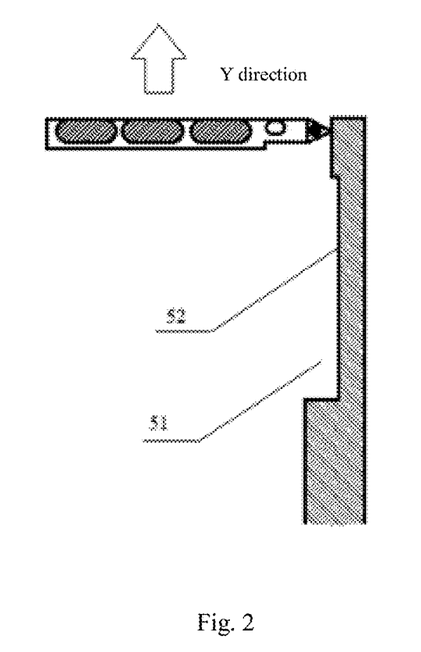
FIG. 2 is an exemplary structural block diagram of an electronic device with a rotatable camera in FIG. 1 with a camera assembly rotated by 90°.
Figure 3:
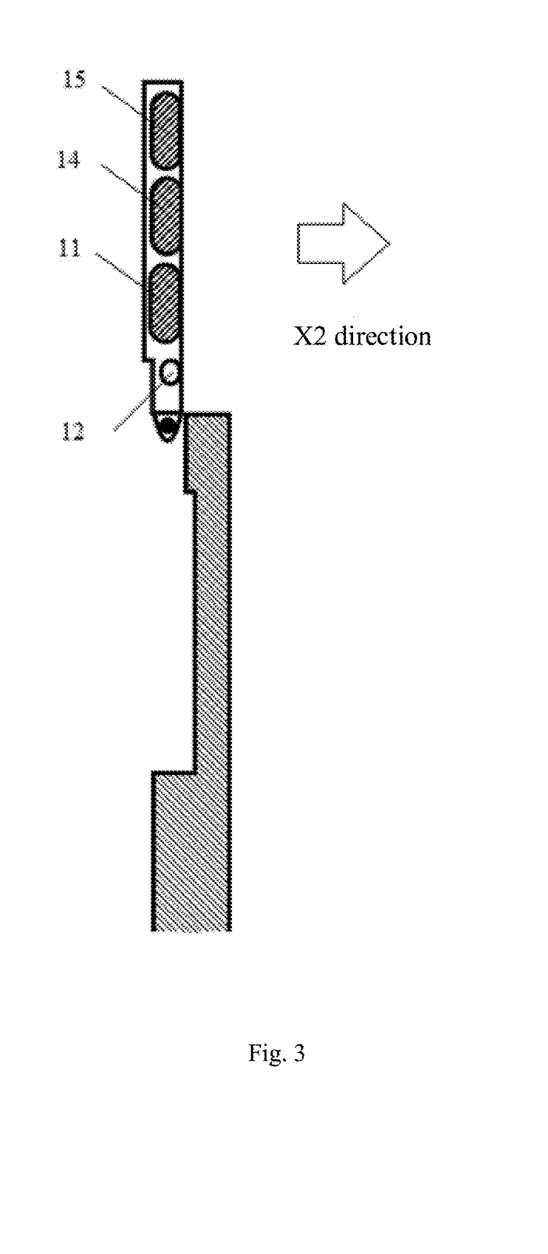
FIG. 3 is an exemplary structural block diagram of an electronic device with a rotatable camera in FIG. 1 with a camera assembly rotated by 180°.

The structure of an electronic device with a rotatable camera is described below with reference to FIG. 1 to FIG. 3. FIG. 1 is an exemplary structural block diagram of an electronic device with a rotatable camera according to an embodiment of the present application. FIG. 2 is an exemplary structural block diagram of an electronic device with a rotatable camera in FIG. 1 with a camera assembly rotated by 90°. FIG. 3 is an exemplary structural block diagram of an electronic device with a rotatable camera in FIG. 1 with a camera assembly rotated by 180°.

As shown in FIG. 1 and FIG. 2, the electronic device with a rotatable camera includes a camera assembly 10, a drive assembly (not shown in the figures), a rotating assembly 30, a controller (not shown in the figures), and a housing 50. The drive assembly, the rotating assembly 30, and the controller are all disposed in the housing 50.

The housing 50 is a polyhedron. One face of the polyhedron is provided with a groove 51, and the groove 51 extends to an edge of the face.

The controller is electrically connected to the drive assembly, the controller controls the drive assembly to drive the rotating assembly 30 to rotate.

The camera assembly 10 is provided in the groove 51, is attached to the rotating assembly 30, and is rotatable around the edge.

According to the technical solution provided in the embodiments of the present application, by providing an electronic device with a rotatable camera in which a camera rotates around a fixed axis, the problem that it is difficult to place a front-facing camera unit in an electronic device with a full-screen display may be resolved. In addition, the space for placing a front-facing camera unit in an electronic device in the related art is released, thereby improving the space utilization of the body of an electronic device and enabling a light and thin body. Further, a plurality of camera lenses are provided in a camera circuit, and the camera assembly can be used as both a rear-facing camera and a front-facing camera, so that the problem in the related art that a front-facing camera has low imaging quality can be resolved.

In some embodiments, the controller may be a microcontroller or an embedded processor, the drive assembly is a stepper motor, and the rotating assembly 30 is a rotating rod. One end of the rotating rod is attached to a main shaft of the stepper motor, and the other end of the rotating rod is inserted in an attaching portion 13 of the camera assembly 10. In addition, the drive assembly can drive the rotating rod to rotate, so as to drive the camera assembly 10 to rotate, thereby expanding the shooting angle of the camera assembly. Optionally, the rotating assembly 30 may be a gear shaft.

Figure 4:
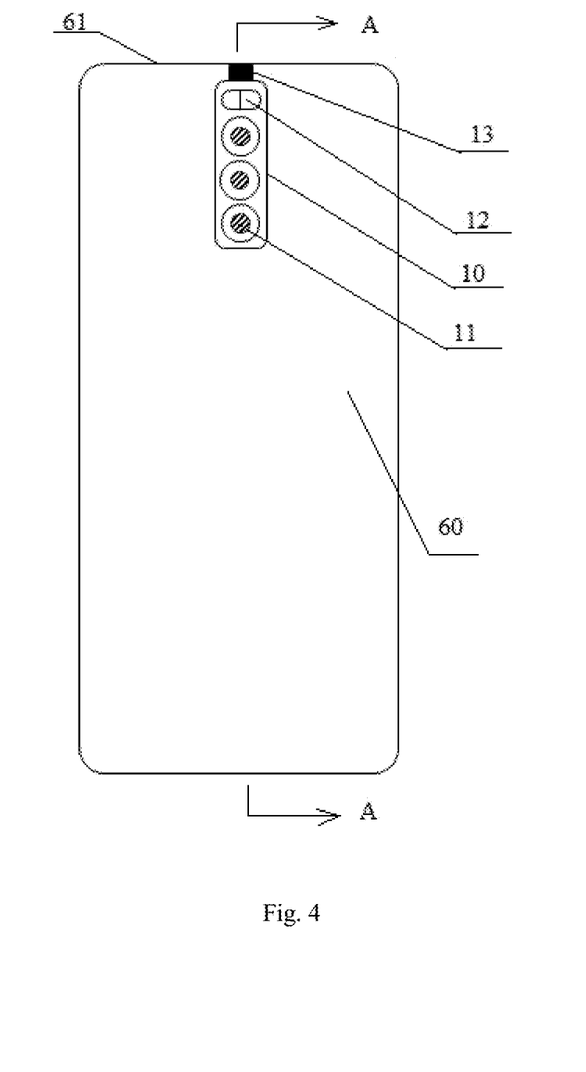
FIG. 4 is an exemplary structural block diagram of the rear face of a mobile phone according to an embodiment of the present application.

It needs to be noted that, as far as a specific electronic device such as a mobile phone is concerned, the foregoing edge is an edge 61 in FIG. 4, and the face is the rear face of the mobile phone. Refer to FIG. 4 for details. The face in which the groove is provided is not limited herein. Any face can be chosen as required.

In some embodiments, the rotating assembly 30 is a rotating rod or a gear shaft, and the rotating rod or the gear shaft is parallel to the edge.

The camera assembly 10 includes an attaching portion 13, and the attaching portion 13 is used to attach the camera assembly 10 to the housing 50.

One end of the rotating assembly 30 is inserted in the attaching portion 13, and the other end is attached to a main shaft of the stepper motor.

During specific operation, the main shaft of the stepper motor drives the rotating rod to rotate, and the rotating rod in turn drives the camera assembly attached to the rotating rod to rotate. In addition, through holes may be provided in surfaces of the housing that are in contact with the attaching portion. Two ends of the attaching portion are disposed in the through holes. The size of the through holes should allow for rotation of the attaching portion in the through holes. Only one attaching structure for attaching the attaching portion and the housing is provided herein, and other manner may be used. This is not limited herein.

In some embodiments, under the control of the controller, a target angle is formed between the camera assembly 10 and the bottom 52 of the groove, and the target angle is any angle between 0° and 180°.

Specifically, as shown in FIG. 1, a shot can be taken of an object in an X1 direction when the target angle formed between the camera assembly 10 and the bottom 52 of the groove is 0°. As shown in FIG. 2, a shot can be taken of an object in a Y direction when the target angle formed between the camera assembly 10 and the bottom 52 of the groove is 90°. As shown in FIG. 3, a shot can be taken of an object in an X2 direction when the target angle formed between the camera assembly 10 and the bottom 52 of the groove is 180°. It needs to be noted that only examples of several typical target angles are provided above. The target angle may be any angle between 0° and 180° in practice.

In some embodiments, the camera assembly includes at least one camera lens 11 and at least one flashlight 12. The quantity of the camera lenses 11 and the quantity of the flashlights 12 are set according to an actual requirement. This is not limited herein.

In some embodiments, the camera assembly includes three camera lenses and one flashlight 12. The camera lens 15, the camera lens 14, the camera lens 11, and the flashlight 12 are sequentially arranged in a direction perpendicular to the rotating rod or the gear shaft, and the flashlight 12 is located on a side proximate to the rotating rod or the gear shaft.

Figure 5:
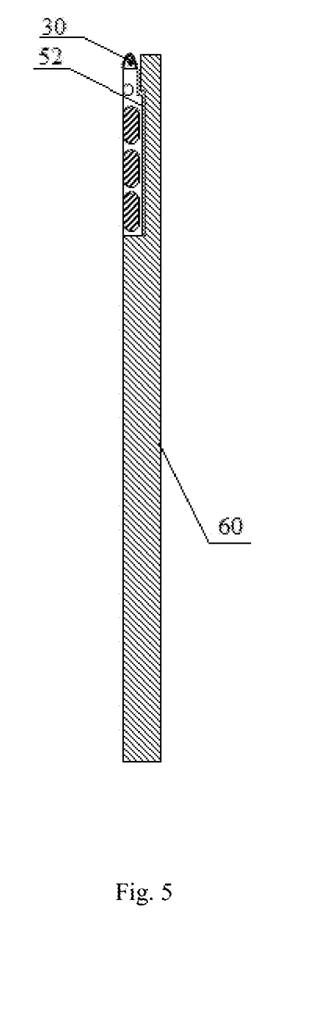
FIG. 5 is a cross-sectional view of the mobile phone in FIG. 4, taken along A-A.
Figure 6:
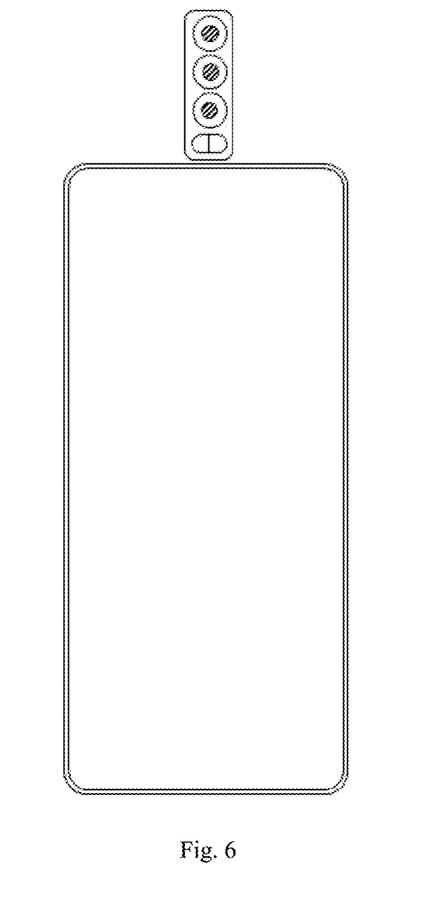
FIG. 6 is an exemplary structural block diagram of a working face of the mobile phone in FIG. 4 with a camera assembly rotated by 180°.

A mobile phone provided in the embodiments of the present application is described below with reference to FIG. 4 to FIG. 6. FIG. 4 is an exemplary structural block diagram of the rear face of a mobile phone according to an embodiment of the present application. FIG. 5 is a cross-sectional view of the electronic device in FIG. 4 taken along A-A. FIG. 6 is an exemplary structural block diagram of a working face of the mobile phone in FIG. 4 with a camera assembly rotated by 180°.

The electronic device may be a device such as a mobile phone, a display or a tablet computer, which are not enumerated herein. In the embodiment, a mobile phone is used as an example for description.

As shown in FIG. 4, the camera assembly 10 is provided in the groove (not shown in the figure). An angle between the camera assembly 10 and the bottom 52 of the groove is 0°. As the rotating assembly 30 rotates, the camera assembly 10 is rotatable around the edge 61 of the mobile phone 60.

In some embodiments, the electronic device includes a working face and a rear face opposite to the working face, the groove is located in the rear face, and the camera assembly is capable of acting as a working-face camera assembly of the electronic device after the camera assembly is rotated by 180 degrees.

Specifically, when the electronic device is a mobile phone, the working face is a face where a display panel is located. Initially, the camera assembly is rear-facing. That is, the camera assembly is located in the rear face of the mobile phone. The camera assembly can be used as a front-facing camera of the mobile phone after the camera assembly is rotated around the edge 61 by 180 degrees.

The camera assembly 10 of the mobile phone, being rear-facing in its initial state as shown in FIG. 5, becomes the front-facing camera assembly as shown in FIG. 6 after the camera assembly is rotated by 180 degrees. Therefore, the problem in the related art that the performance of a front-facing camera of a mobile phone is not desirable is resolved. In addition, the difficulty of providing a camera in a plane in which a full-screen display is located is resolved.

Figure 7:
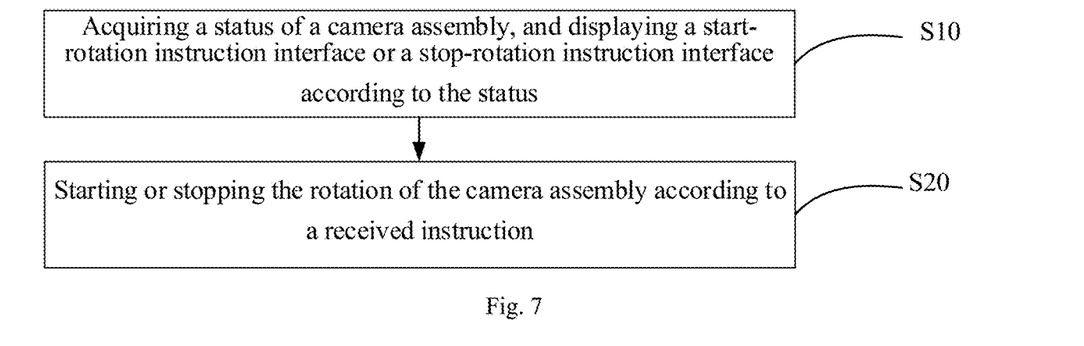
FIG. 7 is an exemplary flowchart of a control method of an electronic device.

The present application further provides a control method of an electronic device. FIG. 7 is an exemplary flowchart of a control method of an electronic device. As shown in the figure, the method includes the following steps.

A step S10 includes: acquiring a status of a camera assembly, and displaying a start-rotation instruction interface or a stop-rotation instruction interface according to the status.

A step S20 includes: starting or stopping the rotation of the camera assembly according to a received instruction.

To satisfy users' demand for multi-angle shooting, a method of controlling a camera assembly based on a user instruction is used as the control method. Specifically, the rotation of the camera assembly is started according to a start-rotation instruction on the start-rotation instruction interface, and the rotation of the camera assembly is stopped according to a stop-rotation instruction on the stop-rotation instruction interface.

In some embodiments, a trigger condition for performing the step S10 and the step S20 may be that the user want to take a picture using a camera, that is, the user activates the camera. Then the status of the camera assembly is acquired, and the start-rotation instruction interface or the stop-rotation instruction interface is displayed according to the status; and the rotation of the camera assembly is started or stopped according to the received instruction.

In some embodiments, the trigger condition for performing the step S10 and the step S20 may be any other occasion. For example, the user only wants to demonstrate the rotation of the camera assembly. This is not limited in the present application.

In some embodiments, the displaying the start-rotation instruction interface or the stop-rotation instruction interface according to the status includes:

displaying the start-rotation instruction interface when the status is a stopped state; and displaying the stop-rotation instruction interface when the status is a rotating state, where the status includes the stopped state and the rotating state.

Specifically, instruction interfaces include the start-rotation instruction interface and the stop-rotation instruction interface. Which one is displayed as a current instruction interface is set according to the status of the camera assembly. The start-rotation instruction interface is displayed when the status is the stopped state. The stop-rotation instruction interface is displayed when the status is the rotating state. It may be understood that a shooting interface is displayed when the status is the stopped state, and the start-rotation instruction interface is displayed after a shooting operation ends. Herein, for conciseness, content related to the shooting interface is omitted.

In some embodiments, the displaying the start-rotation instruction interface when the status is a stopped state includes:

when the stopped state is a rear-facing stopped state, displaying an instruction for rotating to become a front-facing camera;

when the stopped state is a front-facing stopped state, displaying an instruction for rotating to become a rear-facing camera; and when the stopped state is an intermediate stopped state, displaying an instruction comprising a rotate-to-front sub-instruction and a rotate-to-rear sub-instruction, the stopped state includes the rear-facing stopped state, the intermediate stopped state, and the front-facing stopped state, the rear-facing stopped state is a stopped state in which an angle between the camera assembly and the bottom of a groove is 0°, the front-facing stopped state is a stopped state in which the angle between the camera assembly and the bottom of the groove is 180°, and the intermediate stopped state is a stopped state in which the angle between the camera assembly and the bottom of the groove is more than 0° and less than 180°.

A displayed start-rotation instruction may vary depending on a position at which the camera assembly stopped. When the stopped state is the rear-facing stopped state, the displayed instruction is an instruction for rotating to become the front-facing camera, and when the stopped state is the front-facing stopped state, the displayed instruction is an instruction for rotating to become the rear-facing camera. Especially, when the stopped state is the intermediate stopped state, the displayed instruction includes the rotate-to-front sub-instruction and the rotate-to-rear sub-instruction.

In some embodiments, the starting or stopping the rotation of the camera assembly according to the received instruction includes:

controlling the camera assembly to rotate in a direction away from the bottom of the groove when the instruction is the start-rotation instruction for rotating to become the front-facing camera or the rotate-to-front sub-instruction;

controlling the camera assembly to rotate in a direction toward the bottom of the groove when the instruction is the start-rotation instruction for rotating to become a rear-facing camera or the rotate-to-rear sub-instruction; and stopping the rotation of the camera assembly when the instruction is a stop-rotation instruction.

Specifically, according to different instructions, the camera assembly is controlled correspondingly. For example, the camera assembly is controlled to rotate in a direction away from the bottom of the groove when the instruction is the rotate-to-front sub-instruction, and the camera assembly is controlled to rotate in a direction toward the bottom of the groove when the instruction is the rotate-to-rear sub-instruction.

Figure 8:
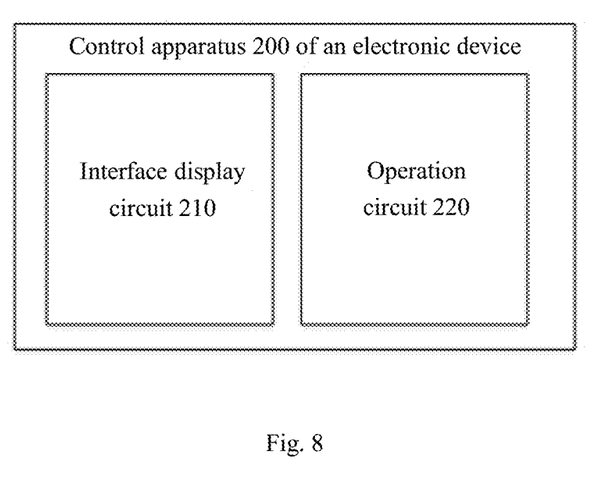
FIG. 8 is an exemplary structural block diagram of a control apparatus of an electronic device.

The present application further provides a control apparatus of an electronic device. FIG. 8 is an exemplary structural block diagram of a control apparatus 200 of an electronic device. As shown in the figure, the apparatus includes:

an interface display circuit 210, configured to acquire the status of a camera assembly, and display a start-rotation instruction interface or a stop-rotation instruction interface according to the status; and an operation circuit 220, configured to start or stop the rotation of the camera assembly according to a received instruction.

The foregoing description is only a description of optional embodiments of the present application and the technical principle thereof. A person skilled in the art should understand that the scope of the present disclosure is not limited to technical solutions formed by specific combinations of foregoing technical features. Rather, other technical solutions formed by any combination of the foregoing technical features or equivalent features thereof, without departing from the concept of the present disclosure, shall be encompassed as well. For example, the technical solutions formed by replacing the foregoing features with technical features having similar functions disclosed in the present application (but not limited to those disclosed in the present application) shall be encompassed.

What is claimed is:

1. An electronic device with a rotatable camera, comprising:
   a camera assembly;
   a drive assembly;
   a rotating assembly;
   a control circuit electrically connected to the drive assembly, and configured to control the drive assembly to drive the rotating assembly to rotate; and
   a housing;
   wherein the housing is a polyhedron and one face of the polyhedron is provided with a groove;
   wherein the groove extends to an edge of the face and a bottom of the groove is recessed with respect to the edge; and
   wherein the camera assembly is provided in the groove, is attached to the rotating assembly, and is rotatable around the edge.

2. The electronic device with the rotatable camera according to claim 1, wherein under control of the control circuit, a target angle is formed between the camera assembly and the bottom of the groove, and the target angle is any angle between 0° and 180°.

3. The electronic device with the rotatable camera according to claim 1, further comprising a working face and a rear face opposite to the working face, wherein the groove is located in the rear face, and the camera assembly is configured to act as a working-face camera assembly of the electronic device after the camera assembly is rotated by 180 degrees.

4. The electronic device with the rotatable camera according to claim 1, wherein the drive assembly is a stepper motor.

5. The electronic device with the rotatable camera according to claim 4, wherein
   the rotating assembly is a rotating rod or a gear shaft, and the rotating rod or the gear shaft is parallel to the edge;
   the camera assembly comprises an attaching portion, and the attaching portion is used to attach the camera assembly to the housing; and
   one end of the rotating assembly is inserted in the attaching portion, and another end is attached to a main shaft of the stepper motor.

6. The electronic device with the rotatable camera according to claim 5, wherein the camera assembly comprises at least one camera lens and at least one flashlight.

7. The electronic device with the rotatable camera according to claim 6, wherein the camera assembly comprises three camera lenses and one flashlight, the three camera lenses and the flashlight are sequentially arranged in a direction perpendicular to the rotating rod or the gear shaft, and the flashlight is located on a side proximate to the rotating rod or the gear shaft.

8. The electronic device with the rotatable camera according to claim 1, wherein the electronic device comprises a mobile phone and a display.

9. A control method of the electronic device with the rotatable camera according to claim 1, comprising:
acquiring a status of the camera assembly, and displaying a start-rotation instruction interface or a stop-rotation instruction interface according to the status; and
starting or stopping a rotation of the camera assembly according to a received instruction.

10. The control method according to claim 9, wherein the displaying the start-rotation instruction interface or the stop-rotation instruction interface according to the status comprises:
displaying the start-rotation instruction interface when the status is a stopped state;
displaying the stop-rotation instruction interface when the status is a rotating state,
wherein the status comprises the stopped state and the rotating state.

11. The control method according to claim 10, wherein the displaying the start-rotation instruction interface when the status is a stopped state comprises:
when the stopped state is a rear-facing stopped state, displaying a start-rotation instruction for rotating to become a front-facing camera;
when the stopped state is a front-facing stopped state, displaying a start-rotation instruction for rotating to become a rear-facing camera; and
when the stopped state is an intermediate stopped state, displaying a start-rotation instruction comprising a rotate-to-front sub-instruction and a rotate-to-rear sub-instruction,
wherein the stopped state comprises the rear-facing stopped state, the intermediate stopped state, and the front-facing stopped state, the rear-facing stopped state is a stopped state in which an angle between the camera assembly and the bottom of the groove is 0°, the front-facing stopped state is a stopped state in which the angle between the camera assembly and the bottom of the groove is 180°, and the intermediate stopped state is a stopped state in which the angle between the camera assembly and the bottom of the groove is more than 0° and less than 180°.

12. The control method according to claim 11, wherein the starting or stopping the rotation of the camera assembly according to the received instruction comprises:
controlling the camera assembly to rotate in a direction away from the bottom of the groove when the instruction is the start-rotation instruction for rotating to become the front-facing camera or the rotate-to-front sub-instruction;
controlling the camera assembly to rotate in a direction toward the bottom of the groove when the instruction is the start-rotation instruction for rotating to become a rear-facing camera or the rotate-to-rear sub-instruction; and
stopping the rotation of the camera assembly when the instruction is a stop-rotation instruction.

13. A control apparatus of the electronic device with the rotatable camera according to claim 1, comprising:
an interface display circuit, configured to acquire a status of the camera assembly, and display a start-rotation instruction interface or a stop-rotation instruction interface according to the status; and
an operation circuit, configured to start or stop a rotation of the camera assembly according to a received instruction.

14. An electronic device with a rotatable camera, comprising:
a camera assembly;
a drive assembly;
a rotating assembly;
a control circuit electrically connected to the drive assembly, and configured to control the drive assembly to drive the rotating assembly to rotate; and
a housing;
wherein the housing is a polyhedron, one face of the polyhedron is provided with a groove, the groove extends to an edge of the face, and the groove has a non-uniform depth in a direction perpendicular to a direction of extension of the edge; and
wherein the camera assembly is provided in the groove, is attached to the rotating assembly, and is rotatable around the edge.

15. The electronic device with the rotatable camera according to claim 14, wherein under control of the control circuit, a target angle is formed between the camera assembly and a bottom of the groove, and the target angle is any angle between 0° and 180°.

16. The electronic device with the rotatable camera according to claim 14, further comprising a working face and a rear face opposite to the working face, wherein the groove is located in the rear face, and the camera assembly is configured to act as a working-face camera assembly of the electronic device after the camera assembly is rotated by 180 degrees.

17. The electronic device with the rotatable camera according to claim 14, wherein the drive assembly is a stepper motor.

18. The electronic device with the rotatable camera according to claim 17, wherein
the rotating assembly is a rotating rod or a gear shaft, and the rotating rod or the gear shaft is parallel to the edge;
the camera assembly comprises an attaching portion, and the attaching portion is used to attach the camera assembly to the housing; and
one end of the rotating assembly is inserted in the attaching portion, and another end is attached to a main shaft of the stepper motor.

19. A control method of the electronic device with the rotatable camera according to claim 14, comprising:
acquiring a status of the camera assembly, and displaying a start-rotation instruction interface or a stop-rotation instruction interface according to the status; and
starting or stopping a rotation of the camera assembly according to a received instruction.

20. A control apparatus of the electronic device with the rotatable camera according to claim 14, comprising:
an interface display circuit, configured to acquire a status of the camera assembly, and display a start-rotation instruction interface or a stop-rotation instruction interface according to the status; and
an operation circuit, configured to start or stop a rotation of the camera assembly according to a received instruction.

* * * * *